US005719603A

United States Patent [19]

Nguyen

[11] Patent Number: 5,719,603

[45] Date of Patent: *Feb. 17, 1998

[54] SPITTOON ABSORBER WETTING AGENT

[75] Inventor: Chan Nguyen, San Diego, Calif.

[73] Assignee: Hewlett-Packard Company, Palo Alto, Calif.

[ * ] Notice: The term of this patent shall not extend beyond the expiration date of Pat. No. 5,517,221.

[21] Appl. No.: 611,967

[22] Filed: Mar. 7, 1996

Related U.S. Application Data

[62] Division of Ser. No. 241,813, May 12, 1994, Pat. No. 5,517,221.

[51] Int. Cl.$^6$ .................... G01D 15/18

[52] U.S. Cl. .................... 347/31; 347/28; 347/36

[58] Field of Search .................... 347/31, 28, 36

[56] References Cited

U.S. PATENT DOCUMENTS

| | | | |
|---|---|---|---|
| 4,306,245 | 12/1981 | Kasugayama et al. | 346/140 |
| 4,872,026 | 10/1989 | Rasmussen et al. | 347/31 |
| 5,159,630 | 10/1992 | Tseng et al. | 380/18 |

*Primary Examiner*—Valerie Lund

[57] ABSTRACT

Wetting an absorber material in the bottom of a spittoon in a service station employed in a thermal ink-jet device, such as a facsimile machine, prevents formation of stalagmites of ink and ensures trouble-free operation of the service station. The absorber, which comprises a material having a high capacity for absorbing the liquid ink, is wetted with a sufficient quantity of a liquid having both a low vapor pressure and capable of wetting the absorber material. Such a liquid comprises a hydrocarbon material, such as a paraffin oil.

6 Claims, 2 Drawing Sheets

SPITTOON ABSORBER WETTING AGENT

This is a divisional of application Ser. No. 08/241,813, now U.S. Pat. No. 5,517,221 filed on May 12, 1994.

TECHNICAL FIELD

The present invention related to facsimile machines that employ ink-jet engines, and, more-particularly, to such facsimile machines including a service station for servicing ink-jet print cartridges.

BACKGROUND ART

Ink-jet printers of the type disclosed and claimed in U.S. Pat. No. 4,872,026, issued Oct. 3, 1989, and assigned to the same assignee as the present application, commonly include a service station for storing the pen(s) during non-use and for performing other operations, such as priming or clearing the nozzles of the pen, sealing the printhead during non-printing operations, and cleaning the printhead.

Dealing with any ink removed from the pen by priming can be messy. The solution posed in the above-mentioned U.S. Pat. No. 4,872,026 utilized both a spittoon and a cap chamber. All nozzles in the printhead are cleared periodically by firing into the spittoon during printing, and all nozzles are fired into the cap chamber each time the cap is engaged to cover the printhead portion of the pen during non-printing operations. Firing into the cap chamber provides a reservoir of ink that acts as a moisture source to keep the printhead from drying up during printing. Attached to the bottom of the cap chamber is a peristaltic pump, which comprises a plastic tube, a roller, and a pump body. One end of the tube is attached to the bottom of the cap chamber, while the other end terminates in free space, over an absorber pad. The absorber pad is used as a holding vessel while any ink that reaches the absorber pad evaporates into the air. The peristaltic pump serves to prime the pen.

The ink-jet engine employed in ink-jet printers, such as that described above, has been successfully utilized in plain paper facsimile machines. Such facsimile machines are being introduced into the market, and incorporate many of the features disclosed in the above-identified U.S. Pat. No. 4,872,026 and other patents related to ink-jet printers.

During normal operation of a thermal ink-jet pen, spitting is required to clear the nozzles of partially evaporated ink before printing. The spittoon is a reservoir that contains this wasted ink. The volatile portion, for example, the vehicle, of the ink in the spittoon will then evaporate over time. In order to speed up evaporation, an absorbent material is placed in the spittoon to spread out the ink and to increase its exposed surface area. However, in high temperature and low humidity environments, a stalagmite of dried ink tends to form, due to the ink chemistry. The stalagmite can interfere with service station operations, and must be eliminated.

Accordingly, means capable of absorbing quantities of ink in the service station of ink-jet facsimile machines while minimizing the formation of stalagmites of ink is required.

DISCLOSURE OF INVENTION

In accordance with the invention, wetting the absorber material in the bottom of the spittoon prevents formation of the stalagmite of ink and ensures trouble-free operation of the service station. The absorber, which comprises a material having a high capacity for absorbing the liquid ink, is wetted with a sufficient quantity of a chemically inert liquid having both a low vapor pressure and capable of wetting the absorber material. An example of a liquid suitably employed in the practice of the present invention is a hydrocarbon liquid, such as a paraffin oil.

BEST MODES FOR CARRYING OUT THE INVENTION

Figure 1:
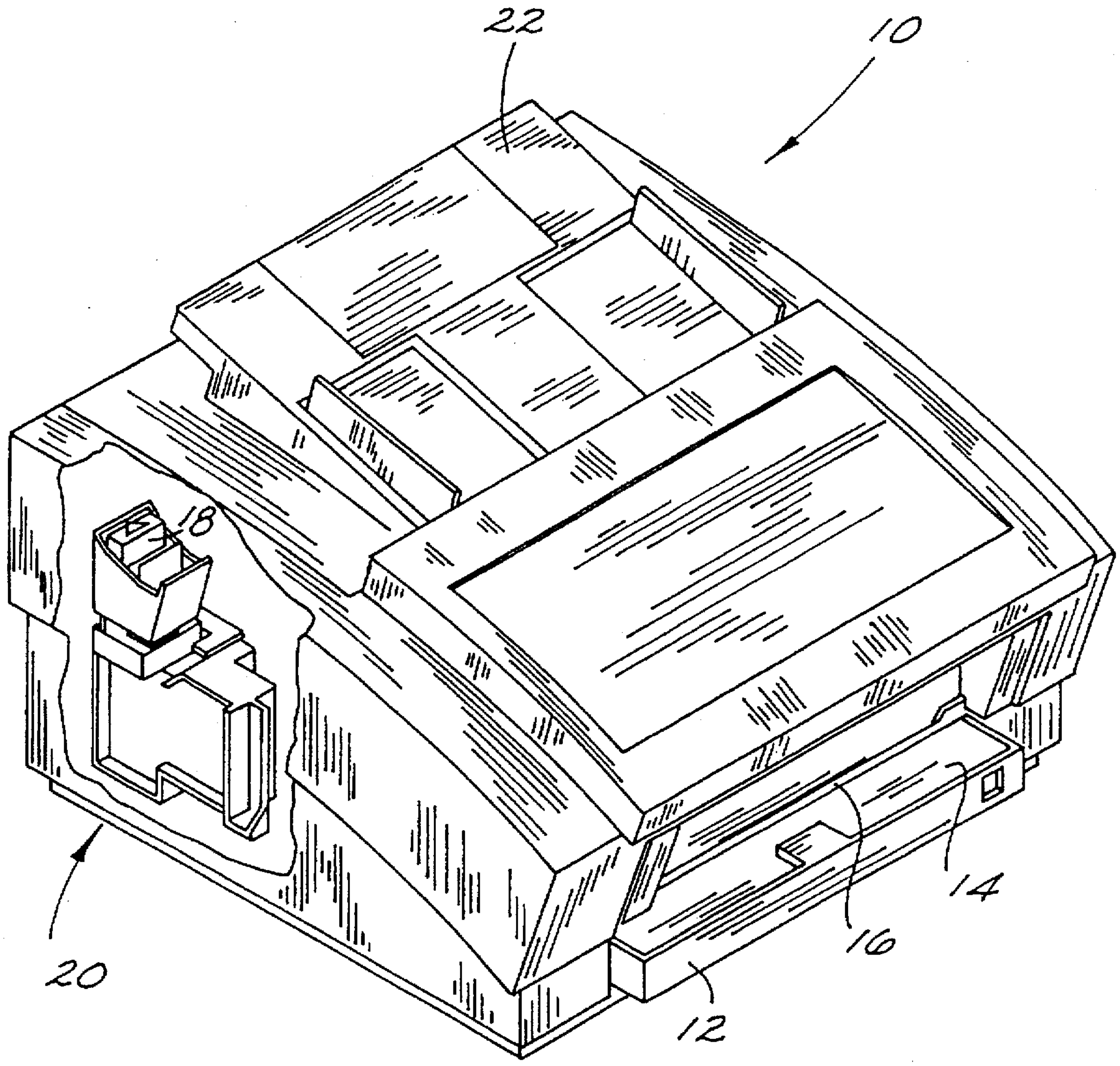
FIG. 1 is a perspective view of a plain paper facsimile machine which uses an ink-jet engine and a service station which employs the spittoon of the invention.

Referring now to FIG. 1, a facsimile machine 10 is shown, comprising a paper feed tray 12 for storing a supply of paper or other print medium 14 to be printed, a paper collection tray 16 for collecting the printed paper, and a print cartridge, or pen 18. In the facsimile machine depicted in FIG. 1, one such cartridge is shown, commonly containing black ink. However, a print cartridge of another primary color (cyan, yellow, magenta) may be substituted for effect. Further, a plurality of such print cartridges, one containing black ink plus print cartridges containing the primary colors, may be employed.

The print cartridge 18 is shown residing in a service station 20, which is described in greater detail below. In FIG. 1, a portion of the facsimile machine 10 is shown broken away to expose the service station 20, To complete the description of the facsimile machine 10, printed material is faxed to a remote location by feeding the printed material along surface 22. Other features of the facsimile machine 10, such as the platen, paper feed mechanism, printer electronics, facsimile transmission electronics, etc., are not depicted, as they are not critical to the spittoon assembly of the invention. Such other features are well known in the art of facsimile transmission ink-jet printing. The above-referenced U.S. Pat. No. 4,872,026, for example, is exemplary of printers using ink-jet engines and service stations.

Figure 2:
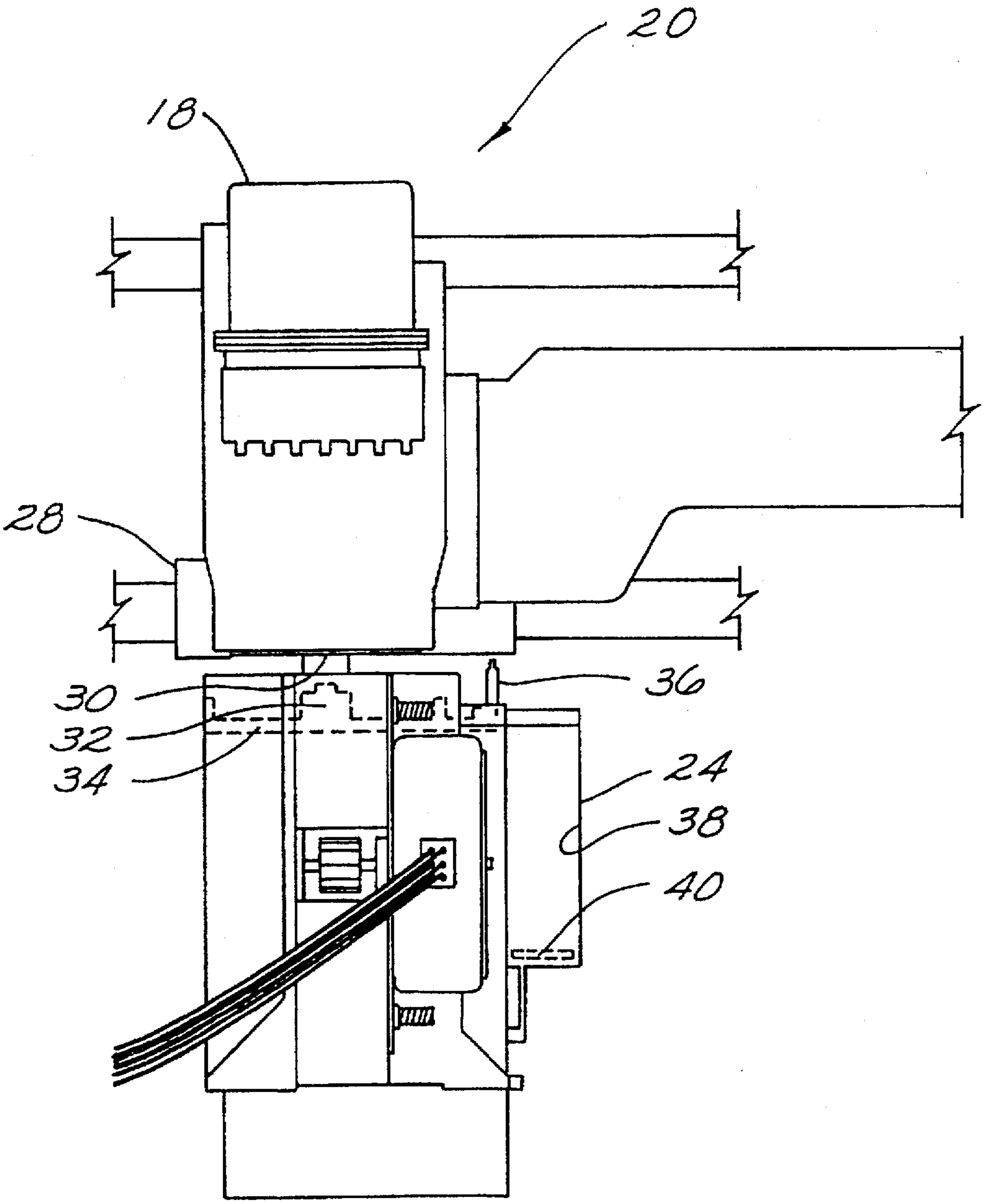
FIG. 2 is a front elevational view, in partial cross-section, of a portion of the ink-jet facsimile machine shown in FIG. 1, depicting the relationship of the spittoon of the invention with respect to the machine's service station for storing and maintaining at least one ink-jet pen (black) and up to three additional pens (for color).

FIG. 2 depicts the details of the service station 20, including the spittoon 24. The service station provides a variety of functions relating to a print cartridge, or pen, 18 mounted in a carriage 28. These include capping the pen orifice plate through which ink is ejected onto a print medium (not shown in FIG. 2), wiping the pen orifice plate to prevent build-up of dried ink on the plate, and clearing the nozzles (not shown) in the pen orifice plate by ejecting ink into the spittoon 20.

Capping is done by positioning the pen 18 over a cap 32 which seals the nozzles and prevents drying of ink therein. A cam (not shown) moves the service station base 34 up, on which is located the cap 32.

Wiping is done first moving the service station base 34 down as the carriage 28 moves to the wipe left position. The pen 18 is moved back and forth a preset number of times to wipe the pen orifice plate 30 with a wiper 36.

Clearing the nozzles is done by moving the pen 18 over the spittoon 24, which comprises a deep well chamber 38, at the bottom of which is located an absorber pad 40

The absorber pad 40 comprises an absorbent material, such as a cellulose fibrous material; an example of such a material is ordinary filter paper.

The size of the spittoon 24 depends on the particular facsimile model. In one facsimile model, the size of the spittoon is 12 mm×12 mm×35 mm, while in another facsimile, the size of the spittoon is 5 mm×20 mm×30 mm. The former facsimile machine thus requires an absorber pad 40 of size 12 mm×12 mm, while the latter printer requires an absorber pad of size 5 mm×20 mm. The thickness of the absorber pad 40 is 2 mm.

Under high temperature and low humidity environments, the absorber pad 40. is not volumetrically efficient in absorbing the ink. Only a small portion of the wasted ink becomes absorbed by the absorber pad 40; the rest of the ink dries up on the surface of the absorber pad. When new ink is spit on top of this layer of dried ink, a mountain of dried ink, called a stalagmite, forms. If not properly contained, this stalagmite of ink (not shown) will grow high enough to touch the pen orifice plate 30. This touching degrades print quality and if the dried ink migrates out of the spittoon, it will dissolve or weaken less chemically-resistant housing parts which surround the service station area.

The problem of stalagmite formation may be observed with any of the inks commonly used in thermal ink-jet facsimile machines. However, due to chemistry and density, the problem is especially exacerbated with black ink.

Investigation by the present inventor has shown that in high temperature, low humidity conditions, a moist absorber pad 40 can soak and spread the ink better than a dry one. In accordance with the present invention, a non-evaporating wetting agent such as paraffin oil is used to keep the absorber moist and to help it retain its absorbing property. Other approaches to solving the problem keep the absorber pad 40 moist by either frequently spitting ink on it, or by recirculating ink through the absorber pad, which tend to waste ink that could otherwise be used in printing.

The wetting agent comprises a substance that is a chemically inert liquid at room temperature. By "chemically inert" is meant that the liquid does not readily chemically react with most substances. The liquid has a low vapor pressure, less than about 20 mm of Hg at room temperature, and wets the absorber material. Preferred as a liquid are any of the paraffin oils, such as those liquid hydrocarbons ranging from octane ($C_8 H_{18}$) to hexadecane ($C_{16} H_{34}$). Most preferred are mixtures of such liquid hydrocarbons, commonly available as lamp oil. Other hydrocarbon liquids may also be suitably employed in the practice of the present invention. Further, the hydrocarbon chain of the hydrocarbon liquid may be straight or branched, so long as it meets the low vapor pressure conditions.

The use of a liquid having a low vapor pressure ensures that the absorber pad 40 remains wet at all times, which enables the ink ejected into the spittoon 24 to spread more easily, and thus avoid stalagmite formation.

The amount of liquid added to the absorber pad 40 is that sufficient to wet the pad without causing it to drip liquid. Typically, for the sizes disclosed herein, a few drops are sufficient. Simple experimentation will suffice to determine the optimum amount for a given absorber pad size.

The present invention (1) eliminates stalagmite created by dried ink build-up, (2) increases efficiency of the absorbent material and spittoon volume, which permits the use of a smaller spittoon and a smaller absorbent material, (3) reduces risk of contamination due to dried ink, (4) makes containment of waste ink easier and more efficient, and (5) eliminates spittoon volume and dimensional requirements.

Advantageously, the present invention is easier and less expensive to implement than other proposed solutions. To date, there are no known spittoon designs using wet absorbers.

INDUSTRIAL APPLICABILITY

The method of preventing stalagmite formation of ink in service station spittoons is expected to find use in thermal ink-jet devices, such as facsimile machines.

Thus, there has been disclosed a method of preventing stalagmite formation in thermal ink-jet facsimile machines employing a service station provided with a spittoon for clearing ink-jet printheads. It will be readily apparent to those skilled in this art that various changes and modifications of an obvious nature may be made, and all such changes and modifications may be made without departing from the scope of the invention, as defined by the appended claims.

What is claimed is:

1. An ink-jet device including an ink-jet print cartridge and means for printing received transmission, said ink-jet device further including a service station for servicing said print cartridge, said service station including a spittoon into which ink from said print cartridge is periodically spit in order to clear nozzles in said print cartridge, wherein said spittoon comprises a container having a bottom for receiving said ink and wherein said bottom of said spittoon is provided with an absorbent material, said absorbent material wetted with a substantially non-reactive liquid having a vapor pressure lower than about 20 mm of Hg at room temperature to increase absorbence by said absorbent material of ink jetted into said spittoon and prevent formation of dried ink in said spittoon.

2. The ink-jet of claim 1 wherein said liquid comprises a hydrocarbon compound.

3. The ink-jet of claim 2 wherein said hydrocarbon compound comprises a paraffin oil.

4. The ink-jet of claim 3 wherein said hydrocarbon compound is selected from the group of hydrocarbons ranging from $C_8H_{18}$ to $C_{16}H_{34}$ and mixtures thereof.

5. The ink-jet of claim 1 wherein said absorbent material has a dimension of 12 mm×12 mm×2 mm.

6. The ink-jet of claim 1 wherein said absorbent material has a dimension of 5 mm×20 mm×2 mm.

* * * * *

UNITED STATES PATENT AND TRADEMARK OFFICE

CERTIFICATE OF CORRECTION

PATENT NO. : 5,719,603

DATED : Feb. 17, 1998

INVENTOR(S) : Nguyen, Chan

It is certified that error appears in the above-indentified patent and that said Letters Patent is hereby corrected as shown below:

At Column 2, line 53, delete "spittoon 20" and insert in lieu thereof --spittoon 24--.

At Column 4, line 3, delete "stalagmite" and insert in lieu thereof --stalagmites--.

Signed and Sealed this

FourthDay of August, 1998

Bruce Lehman

*Attest:*

BRUCE LEHMAN

*Attesting Officer*

*Commissioner of Patents and Trademarks*